Jan. 21, 1958     D. M. FREEMAN     2,820,446
BROILER
Filed July 7, 1954     2 Sheets-Sheet 1

Inventor
Deane M. Freeman
by Roberts, Cushman + Grover
Attys

United States Patent Office 2,820,446
Patented Jan. 21, 1958

2,820,446

BROILER

Deane M. Freeman, Cambridge, Mass.

Application July 7, 1954, Serial No. 441,911

6 Claims. (Cl. 126—25)

This invention relates to broilers and more especially to portable charcoal broilers of the kind disclosed in my Patent No. 2,161,669, which may be used indoors or outdoors for cookouts or the like.

In my aforesaid patent there is shown a broiler consisting of an outer receptacle of rectangular or circular cross section in which is fixed a fuel basket, the latter being smaller in cross section and depth than the outer receptacle so that there is a space below the bottom of the basket and an annular space between it and the walls of the receptacle. A grate is placed across the top of the basket, substantially on a level with the top of the receptacle and forms a broiling surface. As thus constructed, when charcoal is placed in the basket and ignited by paper or shavings placed in the space therebelow, combustion is sustained by a draft rising upwardly from the lower receptacle through the basket, the draft being induced in part by cold air sucked downwardly through the annular space and part by air sucked inwardly through a series of openings in the wall of the receptacle at the bottom part thereof.

Objects of the present invention are to provide a broiler embodying the advantages of my foregoing patent together with improvements which provide for ease in placing fuel therein together with tinder to ignite the same, to provide for a structure which is lighter in weight and hence easier to move about, to provide handle means to assist in moving the broiler about and means for dissipating any heat which may reach the handles so that the broiler may be moved from place to place when in operation by means of the handles without danger of burning the hands, and to provide a broiler which may easily be cleaned. Other objects are to provide a broiler which is of simple, sturdy and durable construction, which is highly efficient in operation and makes a good appearing article of manufacture.

As herein illustrated, the broiler comprises a container open at the top, a fuel basket adapted to be set into the container which is of smaller cross-sectional area and depth than the container so that when located on center there is a space between the basket and the container and a space below the basket between it and the bottom of the container and a pair of diametrically located bails fast to the basket having first portions rising from the bottom thereof in the space between the basket and container, and second portions which extend laterally over the rim thereof. The upwardly rising first portions of the bails frictionally resist separation of the basket from the container so that the container and basket may be lifted as a unit by gripping the lateral portions of the bails. By pressing the bails inwardly toward each other the upwardly rising first portions thereof may be disengaged from the walls of the container thereby to release the basket and hence to permit it to be lifted free from the container.

The invention will now be described in greater detail with reference to the accompanying drawings wherein.

Figure 1:
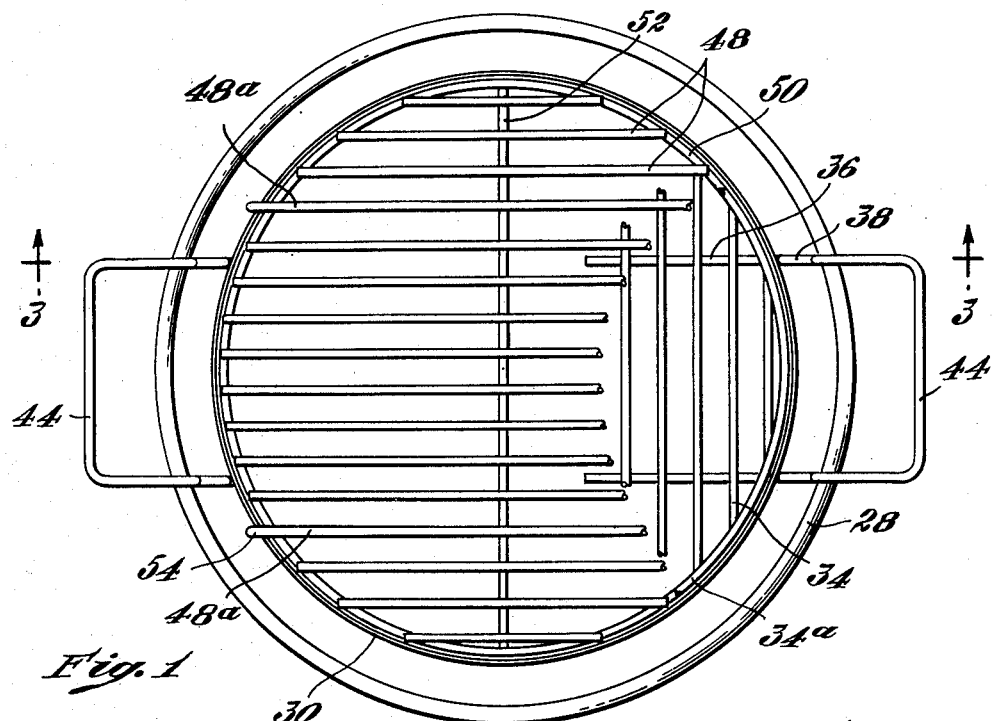
Fig. 1 is a plan view of the broiler showing the upper grate broken away in part.
Figure 2:
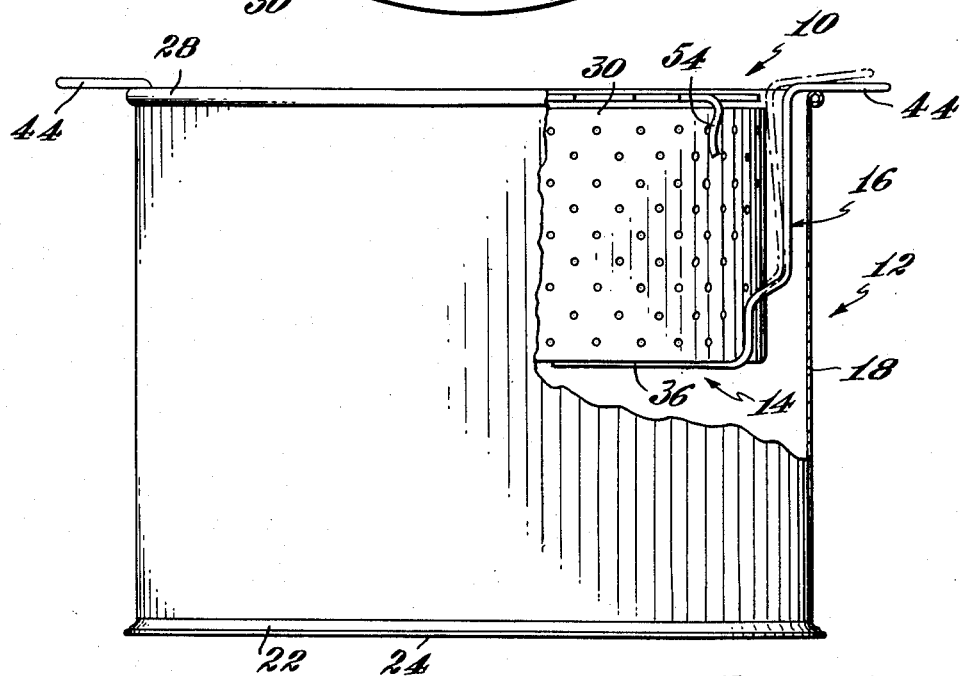
Fig. 2 is a side elevation of the broiler with a portion of the wall thereof broken away to show the fuel basket and support therefor.
Figure 3:
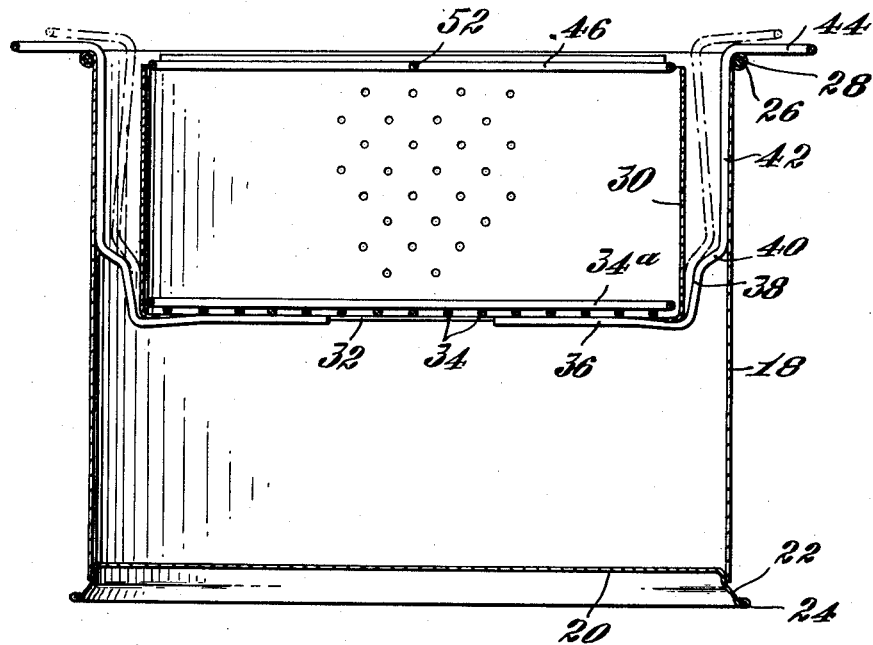
Fig. 3 is a vertical section taken on the line 3—3 of Fig. 1.

Referring to the drawings, Figs. 1 and 2, the broiler comprises an outer container 12, a fuel basket 14 and means 16 for releasably supporting the fuel basket in place. The outer container is comprised of sheet metal, is cylindrical in form and is constituted by an upright cylindrical wall 18 fastened, for example, by welding at its lower edge (Fig. 3) to a flat bottom member 20, which has a downwardly and outwardly diverging skirt 22 terminating in a smooth rolled bead 24, forming a footing for the container which holds it elevated from the surface on which it is resting. The upper edge of the wall 18 is rolled over a reinforcing wire 26 (Fig. 3) which provides a bead-like rim giving strength to the upper edge and affording a finished appearance thereto. The wall and bottom of the container are imperforate and are preferably comprised of light gage, sheet steel so as to dissipate heat fairly rapidly. A coating of appropriate paint or enamel is applied to the wall and bottom of the receptacle to make it attractive and at the same time make it resistant to corrosion. If desired, sheet aluminum or sheet iron or steel coated with zinc, for example, galvanized to increase the resistance of the container to corrosion may be used.

The basket is of corresponding cylindrical shape but is of smaller diameter and less depth than the receptacle. The basket has a perforated wall 30 (Figs. 2 and 3) the lower edge of which is bent inwardly to provide an annular, horizontal flange 32 for receiving a plurality of spaced parallel grate bars 34 which form the bottom thereof. The ends of the grate bars rest on the flange 32 and are spot welded thereto. To further reinforce the bottom a ring 34a is placed within the wall on the top of the grate bars and spot welded to each of the grate bars wherever it intersects the same.

The grate bars and the ring are comprised of iron wire of approximately ⅛″ diameter although as pointed out heretofore, they may be made of other metals, for example, aluminum or galvanized iron wire.

Figure 4:
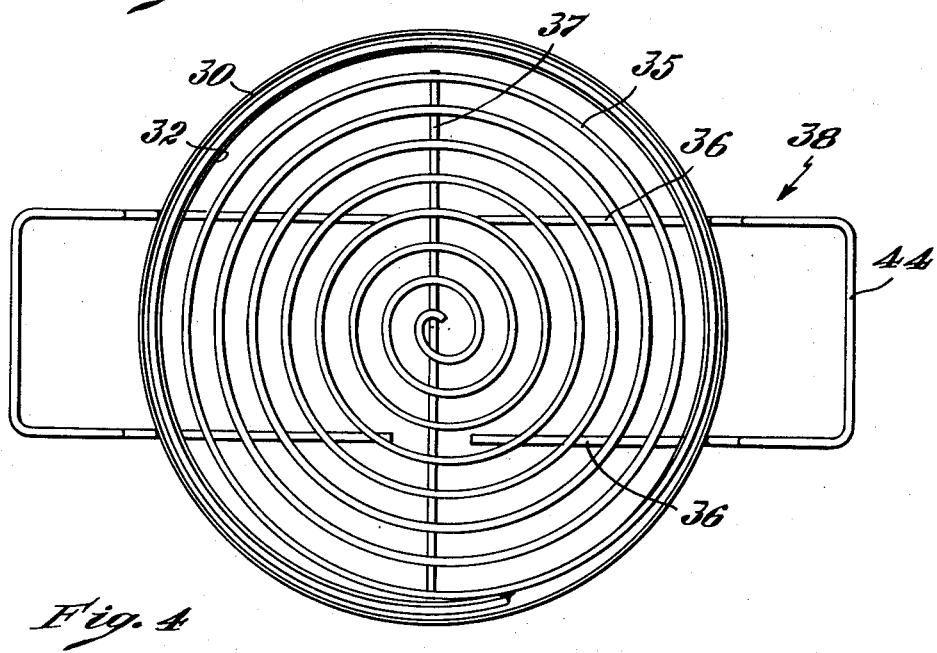
Fig. 4 is a plan view of an alternative form of grate for the bottom of the basket.

Alternately, the bottom of the basket may be an involute coil of wire 35 as shown in Fig. 4, the outermost coil of which is welded to the flange 32. A reinforcing rod 37 is welded to the underside of the coil diametrically thereof and the lengths 36—36 of the supporting means 16 are welded to the underside of the coil at right angles to the rod 37.

The basket is supported on center with the receptacle and at the upper part thereof so that its rim is substantially on a level with the rim of the receptacle by the supporting means 16 of which there are two arranged diametrically opposite each other. Each supporting means 16 is in the form of a bail or loop of wire having spaced parallel legs consisting of horizontal lengths 36—36 welded to the underside of the grate bars 34, lengths 38—38 extending outwardly and upwardly around the lower corner of the basket, which diverge upwardly toward the wall of the container, lengths 40—40 deviating outwardly from the lengths 38—38 so as to cross the space between the wall of the basket and the wall of the container, upright lengths 42—42 joined in offset relation to the lengths 38—38 by the deviating lengths 40—40 engaged with the inside surface of the wall of the container and laterally deviating portions 44—44 extending from the upper extremities of the lengths 42—42 outwardly over the beaded rim of the container. The upwardly and outwardly diverging lengths 38—38 are springy and provide spring means which yieldably press the lengths 42—42 into frictional engagement with the inner wall of the container as shown in full lines in Fig. 3, but are yieldable by the application of pressure to the portions 44—44 inwardly toward each other to the dot and dash line position shown in this figure 3, thereby to disengage the lengths 42—42 from the inner wall of the container thus releasing the basket from the container so that it may be lifted clear thereof by grasping the portions 44—44 and lifting upwardly. The spring-like action of the lengths 38—38 is made stiff enough so that when the lengths 42—42 are left undisturbed in frictional contact with the wall of the container, the latter may be lifted and carried about by gripping the portions 44—44 which constitute handles, both for the basket and for the container. The handles 44—44 where they pass over the bead limit the lowermost position of the basket in the container. The lengths 36—36 which are welded to the grate bars 34 extend inwardly an appreciable distance and assist in rigidifying the bottom of the basket.

It will be observed that while the handles 44—44 are actually connected to the basket and tend to be heated by the burning fuel therein they are kept cool first by the draft of air which passes downwardly through the annular space between the basket and the container and second by contact with the wall of the container which dissipates heat rapidly so that even when the broiler is in operation and the fuel is a glowing mass of coals, the handles are cool enough to be grasped for lifting and moving the broiler about without danger of burning the hands.

A broiling support or grate 46 is placed across the top of the basket and comprises a series of spaced parallel bars 48 (Fig. 1) welded at their opposite ends to a ring 50, the latter being just enough smaller in diameter than the rim of the basket to fit snugly thereinto. The grate bars 48 are reinforced at right angles to their lengths by a diametrically arranged rod 52 welded to the underside thereof. To support the grate in place certain of the bars, to wit, a pair of spaced bars 48a—48a at opposite sides of the center of the grate have at their extremities hooks or claws 54—54 (Fig. 2) which extend beyond the ring 50 and downwardly for yieldable engagement with the outer surface of the basket wall thereby frictionally to hold the same in place. The grate bars, ring and reinforcing rod are comprised of iron wire, of the same kind as used for making the bottom of the basket.

As thus constructed, the basket is held supported in the outer receptacle on center therewith so that there is an annular space between it and the inner wall of the receptacle and a space subjacent to it between the bottom of the basket and the bottom of the outside receptacle. The basket affords a firm but mobile support for fuel, for example, charcoal or coke and the space beneath it a place to place paper, shavings or the like for igniting the fuel in the basket and to receive the ash. A draft is created by movement of air downwardly through the annular space between the basket and the receptacle which is induced by the rising column of hot air from the ignited fuel, which suffices to maintain good combustion without auxiliary openings at the base of the container although these may be employed in addition if desired. Preferably, however, the base of the receptacle is imperforate so that ash will not be spilled out onto the floor if the broiler is used indoors.

To make the broiler ready for use the handles 44—44 are first pressed inwardly to release the basket and then the basket is lifted out of the container. A suitable quantity of fuel is then placed in the basket. Readily burnable tinder, for example, paper or dry shavings is placed in the bottom of the container whereupon the basket is replaced in the container. Since the basket can so easily be removable from and replaced in the container, the basket can easily be taken to a place where fuel is kept stored so that it is not necessary to have an unsightly bag or basket of fuel present at the place of use. Having restored the basket to its place in the container, the tinder may be ignited and will quickly provide sufficient heat and draft to ignite the fuel in the basket. During use of the broiler, if it is desirable to move it from one place to another, this can easily be done by grasping the handles, which as heretofore pointed out remain cool, and lifting the whole broiler. After use the basket may be lifted out of the container so as to dump the hot coals or ashes, thus removing the source of heat from the container which allows it to cool promptly.

It should be understood that the present disclosure is for the purpose of illustration only and that this invention includes all modifications and equivalents which fall within the scope of the appended claims.

I claim:

1. A container, a foraminous basket of lesser cross-sectional area and depth than the container, the bottom of which constitutes a grate and the top of which constitutes a grid, a pair of wire loops, each having a lower part fast to the basket, an upper looped part hooked over the rim of the container, and outwardly sprung intermediate portions rising upwardly through the annular space between the basket and container which intermediate portions frictionally engage the wall of the container and hold the basket suspended therein so that the container and basket may be lifted bodily for transportation by grasping the loops which constitute handles, said intermediate portions being inwardly displaceable by applying sufficient inward pressure to the handles to disengage them from the wall of the container thereby to permit the basket to be removed from the container.

2. A container, a foraminous basket of lesser cross-sectional area and depth than the container, a pair of wire loops, each loop having spaced legs unconnected at their lower ends and looped together at their upper ends, the lower ends of the legs extending beneath the bottom of the basket and being welded thereto, the upper looped ends of the legs being hooked over the rim of the container and supporting the basket above the bottom of the container, and the intermediate portions of the legs being sprung outwardly and rising upwardly from the bottom of the basket through the annular space between the basket and container, said intermediate portions frictionally engaging the wall of the container and holding the basket in place, said looped ends of the legs being inwardly displaceable by application of pressure thereto to disengage the intermediate portions from the wall of the container thereby to release the basket so that it may be lifted free from the container.

3. A broiler according to claim 1, wherein the bottom and wall of the container are made of light gage, sheet metal which dissipates heat rapidly and wherein the bottom is supported in spaced relation to the floor by a light gage metal skirt extending downwardly from the bottom and having a smooth metal bead at its lower extremity for engagement with the floor.

4. A broiler comprising a walled container having an open top, a fuel basket adapted to be set into the container, said fuel basket having a foraminous sheet metal wall of smaller cross-sectional area than that of the container so that when located on center therewith there is an annular space between the basket and the container, and having a vertical depth less than that of the container so that when located with its top near the top of the container there is a space subjacent to the basket, an inwardly bent flange at the lower end of the wall, a plurality of spaced bars arranged with their ends resting on the flange and welded thereto, and a metal ring overlying the rods and welded thereto, said spaced bars constituting a grate at the bottom of the basket for supporting fuel, and a pair of bales fast to the basket at diametrically located points, said bales having first portions rising from the bottom of the basket in the annular space between it and the container, and portions extending up over the rim of the container, said first portions of the bales frictionally engaging the wall of the container and resisting separation of the basket from the container so that the container and basket may be lifted as a unit by grasping the upwardly extending portions of the bales, said upwardly extending portions of the bales being yieldable by application of pressure inwardly to disengage the first portions from the wall of the container, thereby to release the basket and permit it to be lifted free from the container.

5. A broiler comprising a walled container having an open top, a fuel basket adapted to be set into the container, said fuel basket having a smaller cross-sectional area than that of the container so that when located on center therewith there is an annular space between the basket and the container, and having a vertical depth less than that of the container so that when located with its top near the top of the container there is a space subjacent the basket, a perforate bottom and a grid at its top consisting of a circular wire frame adapted to fit within the rim of the basket, a plurality of spaced parallel rods welded to the ring, and means carried by the ring extending across the rim of the basket and yieldably engaging the outer wall thereof, for frictionally holding the grid in place, said grid constituting a support for food which is to be broiled, and a pair of bales fast to the basket at diametrically located points, said bales having first portions rising from the bottom of the basket in the annular space between it and the container, and portions extending up over the rim of the container, said first portions of the bales frictionally engaging the wall of the container and resisting separation of the basket from the container so that the container and basket may be lifted as a unit by grasping the upwardly extending portions of the bales, said upwardly extending portions of the bales being yieldable by application of pressure inwardly to disengage the first portions from the wall of the container, thereby to release the basket and permit it to be lifted free from the container.

6. A broiler according to claim 5, wherein the bottom of the basket is constituted by a wire coiled in involute form.

References Cited in the file of this patent
UNITED STATES PATENTS

| | | |
|---|---|---|
| 246,561 | Sassinot et al. | Aug. 30, 1881 |
| 422,899 | Adams et al. | Mar. 11, 1890 |
| 528,594 | During | Nov. 6, 1894 |
| 2,158,236 | Haislip | May 16, 1939 |
| 2,179,095 | Kelsey | Nov. 7, 1939 |
| 2,297,843 | Sharpnack | Oct. 6, 1942 |
| 2,628,738 | Hilldale | Feb. 17, 1953 |